(12) United States Patent
Knox et al.

(10) Patent No.: US 7,072,947 B1
(45) Date of Patent: Jul. 4, 2006

(54) METHOD AND SYSTEM FOR MONITORING E-MAIL AND WEBSITE BEHAVIOR OF AN E-MAIL RECIPIENT

(75) Inventors: Andrew Knox, San Francisco, CA (US); Lars Knox, San Francisco, CA (US); John Hart, Washington, DC (US)

(73) Assignee: Ihance, Inc., San Francisco, CA (US)

( * ) Notice: Subject to any disclaimer, the term of this patent is extended or adjusted under 35 U.S.C. 154(b) by 505 days.

(21) Appl. No.: 10/289,690

(22) Filed: Nov. 6, 2002

Related U.S. Application Data

(60) Provisional application No. 60/333,287, filed on Nov. 6, 2001.

(51) Int. Cl.
*G06F 13/00* (2006.01)

(52) U.S. Cl. ...................................... 709/217; 709/224
(58) Field of Classification Search ........ 709/200–203, 709/206, 217, 218–220, 223–224, 227
See application file for complete search history.

(56) References Cited

U.S. PATENT DOCUMENTS

| | | | | |
|---|---|---|---|---|
| 5,937,162 | A | * | 8/1999 | Funk et al. ................. 709/206 |
| 6,192,403 | B1 | * | 2/2001 | Jong et al. .................. 709/224 |
| 6,449,634 | B1 | | 9/2002 | Capiel |
| 6,631,400 | B1 | * | 10/2003 | DiStefano, III ............. 709/206 |
| 6,704,772 | B1 | * | 3/2004 | Ahmed et al. .............. 709/207 |
| 6,725,269 | B1 | | 4/2004 | Megiddo |
| 6,744,761 | B1 | * | 6/2004 | Neumann et al. ........... 370/389 |

(Continued)

OTHER PUBLICATIONS

Eloqua Products Web Page, http://www.eloqua.com/Products/Products.asp, Apr. 25, 2002, 2 pages.

(Continued)

*Primary Examiner*—Moustafa M. Meky
(74) *Attorney, Agent, or Firm*—Townsend & Townsend & Crew LLP

(57) ABSTRACT

A system for monitoring email and website behavior of an email recipient is provided. According to one exemplary embodiment, the system includes a mail enhancement server and a logging server. The mail enhancement server is configured to intercept all outgoing emails from a mail server. The mail enhancement server then modifies each outgoing email to include a tracking code. The tracking code is embedded in an image call which in turn is also inserted into the outgoing email. If the outgoing email contains hyperlinks, each hyperlink is also modified to include the tracking code. The tracking code is uniquely associated with the outgoing email. The image call (and the tracking code) is used to detect when the recipient of the outgoing email has opened that email. The tracking code, when embedded in a hyperlink, is also used to monitor whether the recipient has opened the email and/or clicked through on one or more of the hyperlinks in the email. The logging server associates a cookie with the recipient of the outgoing email. When the logging server receives an image call, the corresponding image and the cookie are concurrently delivered to the recipient. The cookie is used to monitor the behavior of the recipient at a website, regardless of how the recipient arrives at that website, be it through a click-through from the email or otherwise. The logging server is configured to capture and store relevant information relating to the outgoing email thereby allowing the sender of the outgoing email and the recipient to be linked and the behavior of the recipient to be monitored via the tracking code, the image call and the cookie.

44 Claims, 3 Drawing Sheets

U.S. PATENT DOCUMENTS

| | | |
|---|---|---|
| 6,763,383 B1 * | 7/2004 | Evison et al. ................ 709/224 |
| 6,895,438 B1 | 5/2005 | Ulrich |
| 2002/0038350 A1 * | 3/2002 | Lambert et al. ............ 709/217 |
| 2002/0042815 A1 * | 4/2002 | Salzfass et al. ............. 709/206 |
| 2002/0052785 A1 | 5/2002 | Tenenbaum |
| 2003/0025943 A1 * | 2/2003 | Carey ......................... 358/402 |
| 2003/0115074 A1 * | 6/2003 | Freeman et al. ................ 705/1 |
| 2005/0075946 A1 * | 4/2005 | Henning et al. .............. 705/26 |

OTHER PUBLICATIONS

Eloqua Sales Support Page, http://www.eloqua.com/Poducts/salessupport.asp, Apr. 25, 2002, 2 pages.

Eloqua Sales Support Module Web Page, http://www.eloqua.com/flexdemo/ChatStep1.asp, Apr. 25, 2002, 1 page.

* cited by examiner

| Email Event → | 1st open | Subsequent event |
|---|---|---|
| ↓ Prior Cookie State | | |
| New | C ⇐ Primary for A | C ⇐ Primary for A |
| Secondary for recipient (A) | C ⇐ Primary for A | no-op |
| Primary for recipient (A) | no-op | no-op |
| Secondary for other (B) | C ⇐ Primary for A, not B | C ⇐ Secondary for A<br>C ⇐ Secondary for B |
| Primary for other (B) | See Text | Event interpreted as "mail forwarded to B" |

*FIG. 3*

METHOD AND SYSTEM FOR MONITORING E-MAIL AND WEBSITE BEHAVIOR OF AN E-MAIL RECIPIENT

CROSS-REFERENCES TO RELATED APPLICATION

The present application claims the benefit of priority under 35 U.S.C. § 119 from U.S. Provisional Patent Application Ser. No. 60/333,287, entitled "METHOD AND SYSTEM FOR MONITORING EMAIL AND WEBSITE BEHAVIOR OF AN EMAIL RECIPIENT" filed on Nov. 6, 2001, the disclosure of which is hereby incorporated by reference in its entirety for all purposes.

BACKGROUND OF THE INVENTION

The present invention generally relates to email management, and more specifically, to a method and system for monitoring email and website behavior of an email recipient.

Due to their convenience and popularity, emails have become a major channel for communications amongst individuals and businesses. Since emails can be used to reach a much wider audience in a short period of time, emails have also been utilized regularly as a tool in marketing campaigns. There is a number of email marketing companies which have established a market for tracked email campaigns. These companies provide feedback to the email sender when an email was opened by its intended recipient. Generally, this is accomplished via the inclusion of a 'web beacon' (or a single-pixel gif) which is uniquely coded and linked to the particular recipient of the email. More specifically, in order to generate and send emails for a tracked campaign, an end user goes through a multi-step workflow that typically includes: (1) recipient list creation/selection—loading into a mass-mail tool a list of possible recipients and creating a recipient list containing selected recipients for a particular campaign; (2) template authoring—using the mass-mail tool to author the HTML email according to one or more predefined templates; and (3) mail merge and execution (send)—merging the recipient list into the predefined templates, thereby creating separate emails which contain unique tracking codes in the form of references to an image on a remote server. These emails are then sent by a mail bursting engine. When the recipient opens the email in an HTML-enabled email client, the email client contacts the remote server to retrieve the desired image. Because each image is uniquely coded, the remote server is able to track when the email intended for a particular recipient was opened.

The foregoing method of tracking status of an email for a marketing campaign has its shortcomings, however. For example, a list of specific recipients whose behavior is to be monitored needs to be created or identified prior to the creation of the emails. Furthermore, while some technologies exist to monitor behavior of an email recipient, such as, whether an email has been opened, who clicked through via an email and what part of a website an individual has visited, there is relatively little correlation between the behavior of the email recipient and the sender. Hence, it would be desirable to provide a method and system that is capable of monitoring behavior of an email recipient in relation to a sender.

Moreover, the conventional way of processing and distributing emails makes it difficult to monitor the individual behavior of an email recipient. Typically, an email server processes emails on a per-recipient-domain basis. For example, if a user sends an email to three recipients respectively identified by three email addresses: a@one.com, b@one.com, and c@two.com, then the user's email server will split the single email on the basis of unique recipient domains (in this case, one.com and two.com) and process accordingly. In this example, the user's email server would connect to the email server for one.com and deliver a single copy of the email. It is then up to the email server for one.com to create and deliver two copies of the email to both a@one.com and b@one.com simultaneously. The user's email server would also separately connect to the email server for two.com and deliver a separate copy of the email to c@two.com. Since emails are processed on a per-recipient-domain basis, respective behavior of the recipients within a single domain is difficult to monitor. It is not unusual for a single domain to have thousands, if not millions, of recipients. Therefore, it would also be desirable to provide a method and system that is capable of monitoring behavior of email recipients within a single domain.

BRIEF SUMMARY OF THE INVENTION

A system for monitoring email and website behavior of an email recipient is provided. According to one exemplary embodiment, the system includes a mail enhancement server and a logging server. The mail enhancement server is configured to intercept all outgoing emails from a mail server. The mail enhancement server does not interfere with the workflow of the mail server or the email client that is used to compose the outgoing mails. The mail enhancement server modifies each outgoing email to include a tracking code. The tracking code is embedded within an image call which is also included in the outgoing email. In addition, if the outgoing email contains hyperlinks, each hyperlink is also modified to include the tracking code. The tracking code is uniquely associated with the outgoing email, each individual recipient of the outgoing email (in the case where the outgoing email is addressed to multiple individuals, for example, using the "cc" field of an email), the sender of the outgoing email, or the sender's business association, or a combination thereof. The image call (and the embedded tracking code) is used to detect when the recipient of the outgoing email has opened that email. When the tracking code is embedded in a hyperlink in the outgoing email, the tracking code is also used to monitor whether the recipient has opened the outgoing email and/or clicked through on one or more of the hyperlinks in the outgoing email.

The logging server associates a cookie with the recipient of the outgoing email. When the logging server receives an image call (thereby indicating that the recipient has opened the outgoing email), the corresponding image and the cookie are concurrently delivered to the recipient. The cookie is used to monitor the behavior of the recipient at a website, regardless of how the recipient arrives at that website, be it through a click-through from the email or otherwise.

The logging server is configured to capture and store relevant information relating to the outgoing email thereby allowing the sender of the outgoing email and the recipient to be linked and the behavior of the recipient to be monitored via the tracking code, the image call and the cookie.

The mail enhancement server forwards the modified outgoing emails to their intended recipients. When a recipient opens the email (which means an image call is relayed to the logging server), the logging server forwards the cookie associated with the recipient and the corresponding image to the recipient. The tracking code, the image call and the cookie, where appropriate, are used by the logging server to monitor the activities of the recipient in relation to the email as well as websites visited by the recipient. The activities of the recipient can then be captured by the logging server and reported to the sender of the email.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 3 is a table illustrating the state transition of a cookie based on prior cookie state and type of email event that took place according to one exemplary method of the present invention.

DETAILED DESCRIPTION OF THE INVENTION

Figure 1:
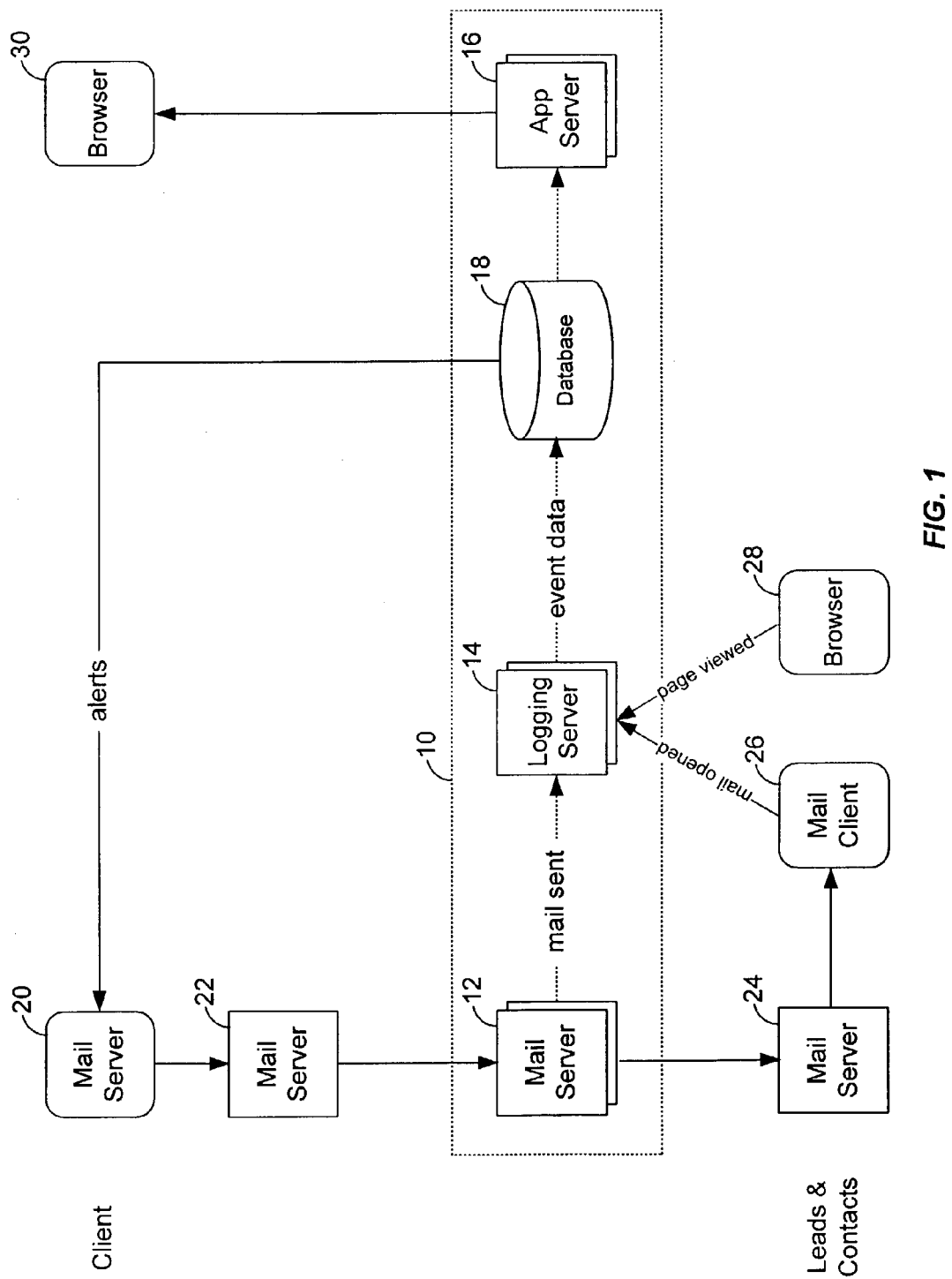
FIG. 1 is a simplified block diagram illustrating an exemplary embodiment of the present invention.

The present invention in the form of one or more exemplary embodiments will now be described. FIG. 1 is a simplified block diagram illustrating an exemplary embodiment of the present invention. Referring to FIG. 1, an exemplary embodiment of the present invention includes a system 10 having a mail enhancement server 12, a logging server 14, an application server 16 and a database 18. The exemplary operations of the system 10 are further described below.

The system 10 operates in the following exemplary manner. A user or sender composes an email to a recipient using an email client 20. The email originates from an email account belonging to the sender. The email account is associated with a single domain which in a business context is typically owned by the sender's company or corporation. In other situations, the email account can be a personal account associated with another single domain, such as, Yahoo. The recipient uses a corresponding email account to receive the email after it has been processed as further described below. The email account of the recipient is associated with a domain that is different from that of the sender's email account. The email client 20 can be application- or web-based and includes any device that can be used by the user or sender to send and receive his/her personal and/or corporate email correspondence. Examples of the email client 20 include but are not limited to Microsoft Outlook, Outlook Express, Outlook Web Access, Netscape Email, Eudora, Lotus Notes Mail, Yahoo Mail, as well as Blackberry and other similar portable devices. As will be further described below, in one exemplary embodiment, the system 10 is transparent to the user and functions seamlessly in cooperation with the email client 20 without altering the workflow of the user. In other words, the user is able to continue to utilize the various functions offered by the email client 20 without having to deviate from the routines associated with using such functions.

The email is then sent by the email client 20 to its associated mail server 22. Rather than sending the email directly to the recipient, the email client's mail server 22 routes the outgoing email to the system 10, more specifically, the mail enhancement server 12. In other words, the mail enhancement server 12 intercepts the outgoing email coming from the email client's mail server 22. Optionally, the mail enhancement server 12 has the capability to determine how the outgoing mail is to be processed. For example, based on a company "opt-out" policy, certain recipients may be excluded from receiving emails from the sender. This situation occurs, for instance, when a first company decides not to forward promotional or marketing emails to individuals associated with a second company. As a result, salespersons from the first company are prevented by the mail enhancement server 12 to send any emails to individuals in the second company. This capability of the mail enhancement server 12 can be controlled by a system administrator, for example.

If the outgoing email is to be processed, then transparent to the user and the recipient, the mail enhancement server 12 edits the outgoing email to contain a tracking code or mechanism that uniquely identifies the outgoing email, the user who originated the outgoing mail, the user's business association (such as the user's employer) or the recipient, or a combination thereof. Using the tracking code, outgoing emails originated from a single domain or business entity can be monitored. For example, outgoing emails from individuals within a company or corporation can be monitored. Alternatively, the tracking code can also be used to monitor outgoing emails originated from individuals respectively associated with a group of related business entities.

The tracking code can be inserted into the outgoing email in number of ways. For example, any hyperlink(s) to a website associated with the user are modified to contain this tracking code. The hyperlink can be modified in a number of ways to include the tracking code. For example, the tracking code can be embedded in or appended to the hyperlink. As a result, when the recipient clicks through on a modified hyperlink within the modified outgoing email to a corresponding website, the corresponding website which is equipped to monitor the tracking code is then able to detect that the modified outgoing email has been opened and a click-through from within the modified outgoing email has occurred.

In another example, the mail enhancement server 12 inserts the tracking code into an image call which, in turn, is inserted into the email. This image call is uniquely associated with the email, specifically, the association being with a single recipient of the email, and is directed to the logging server 14. The situation in which the email has multiple recipients will be further described below. Also, as will be further described, when the email is opened, the image call is activated. Upon activation, the image call is relayed to the logging server 14 to retrieve the corresponding image associated with that image call. The image can be, for example, a zero-pixel gif or the user's (or user company's) logo. More importantly, since the image call contains the tracking code, the receipt of the tracking code represents an indication that the email has been opened.

Optionally, the logging server 14 associates a cookie (or an identifier containing identification information) with the recipient of the email. For example, when the logging server 14 receives an image call (thereby indicating that the email has been opened), the corresponding image and the cookie are concurrently delivered to the recipient. If a cookie associated with the recipient has been previously sent, then only the corresponding image is delivered to the recipient. Alternatively, if a cookie is already present on a device being used by the recipient but the cookie is otherwise not associated with the recipient, the logging server 14 then can simply establish an association between the cookie and the recipient.

In addition, the logging server 14 can also forward a cookie to the recipient when the recipient clicks on a modified hyperlink in the email. One situation in which the logging server 14 delivers the cookie in this manner is when the recipient's email client rejects cookies but his/her browser accepts them.

The cookie is uniquely coded to identify the recipient. It should be noted that the cookie does not identify the recipient per se. Rather, the cookie identifies the recipient's browser or an agent used by the recipient to access the Internet. If the recipient's browser or agent is under almost exclusive control of the recipient, then the behavior exhibited by the recipient's browser or agent should closely approximate the actual behavior of the recipient. As will be further described below, when the recipient visits a website that is equipped to detect and monitor the cookie, the cookie given to the recipient is transmitted by the recipient's browser to the website thereby allowing the website to identify the recipient. Since the cookie is stored on the recipient's browser, the recipient's behavior at the website can still be monitored even though the recipient did not click through a hyperlink in the email. As a result, an otherwise anonymous website visit can be reliably identified as one belonging to the recipient of the email.

In an alternative embodiment, the mail enhancement server 12, instead of inserting the tracking code into an outgoing mail, posts the outgoing email onto the logging server 14 and informs the recipient that the outgoing email is available at the logging server 14. It should be noted that alternatively the outgoing email can be posted onto other http locations for access. Upon the recipient accessing the logging server 14 to retrieve the email, the logging server 14 similarly forwards a cookie (or an identifier containing identification information) to the recipient. The cookie can then be used to monitor the email and/or website behavior of the recipient.

As described above, the mail enhancement server 12 can be a Simple Mail Transfer Protocol (SMTP) server that is compatible with any combination of mails servers and email clients. It should be understood that the insertion of the tracking code and the image call into the email can be performed at any time prior to its delivery to the recipient. Furthermore, it should be noted that the functionality of the mail enhancement server 12 as described above can be implemented in a number of different ways. In alternative embodiments, the functionality of the mail enhancement server 12 including insertion of the tracking code and image call can be performed, for example, by the mail server 22 associated with the email client 20, a mail relay server, the email client 20 itself, a plug-in to the email client 20 or an email client utility.

The mail enhancement server 12 is also equipped to handle a single email with multiple recipients so as to allow each recipient to be monitored individually. The mail enhancement server 12 examines the email and determines whether the email has multiple recipients. If there are multiple recipients, the mail enhancement server 12 creates as many copies of the email as there are recipients. Each copy of the email is then modified with its own unique tracking code, image call and cookie, as described above. Each copy of the email is treated as if it was an original. The recipient identity fields (such as, "To", "Cc" and "Bcc", etc.) for each copy of the email is maintained the same as the original. This is done to allow each recipient to know that the email is also delivered to other recipient(s).

After the email is modified to include the tracking code and the image call, the mail enhancement server 12 forwards the email to the recipient via a recipient mail server 24 and sends information regarding this email to the logging server 14. The logging server 14 collects and records information relating to the email including, for example, identity of the user who sends the email, identity of the email recipient, the associated tracking code and image call. Also, the logging server 14 associates a cookie with the recipient, where appropriate, when the recipient opens the email signified by the activation of the image call in the email. Alternatively, the logging server 14 can also associate a cookie with the recipient, where appropriate, when the recipient clicks on a modified hyperlink in the email. Using the information relating to the email and the cookie, the logging server 14 can then monitor the behavior of the email recipient in a number of different ways, as further described below.

Optionally, the logging server 14 can examine the information relating to the email and classify the email based on certain predetermined criteria. For example, in an exemplary embodiment where the system 10 is configured to handle emails from various mail servers, the emails can be classified and grouped based on the respective sender domains, recipient domains or individual senders. This facilitates subsequent reporting of information. For instance, the monitored email and website activities of recipients belonging to a specific single domain can be reported, that is, activities resulting from emails originated from a particular company or corporation can be monitored and reported; alternatively, those activities of recipients receiving emails from a specific sender can also be reported. In another example, the email can be classified as "as definitely not spam" and "possibly spam". Based on the disclosure and teachings provided herein, a person of ordinary skill in the art will know of the various ways to classify the emails in accordance with the present invention. In an alternative embodiment, the present invention can also be used to classify incoming emails. For example, incoming emails can be examined to classify external contacts as "known business contacts" for reporting or for classification as "not spam" for future outgoing emails to these contacts.

Optionally, the mail enhancement server 12 can also forward a copy of the email to a contact management database that is used to maintain an archival history of emails sent to various recipients. The contact management database can then associate that copy of the email with the appropriate recipient.

When the recipient opens the email using an email client 26, the associated image call is activated and sent to the logging server 14. By examining the associated image call (which contains the associated tracking code), the logging server 14 is then able to determine that the email has been opened. Optionally, the logging server 14 can also monitor cookies received at a website to identify their respective recipients thereby allowing additional information about these recipients to be collected. The process of using the cookie to collect additional information about the recipient will be further described below. With or without the cookie, the logging server 14 can also use the tracking code to monitor the website browsing behavior exhibited by the recipient. When the recipient activates or clicks through on one or more of the hyperlinks in the email, a browser 28 is used to contact the relevant website. Since the tracking code is embedded in or appended to the hyperlink(s) and if the logging server 14 is given access to monitor activities on the website, the behavior of the recipient with respect to the website can be monitored using the associated tracking code. The use of the tracking code allows the recipient's behavior at a website to be monitored and reported. As mentioned above, the use of the tracking code embedded in a clicked-on hyperlink also allows a cookie to be associated with the recipient. Alternatively, the website can be enhanced to include scripts that are able to recognize the tracking code and monitor the subsequent behavior of the recipient associated with the tracking code. The website can then report the monitored behavior to the logging server 14 which, in turn, can take appropriate actions to report to the sender of the email.

As mentioned above, a cookie can be used to collect information about the recipient of an email. In this context, a cookie can be viewed as unique identification information associated with an agent (e.g., a PC) used by a recipient to access an email. For purposes of illustration and simplicity, a cookie is described herein as accessing an email. An image resides on a server and the cookie contacts the server to retrieve the image using the image call which is included in the email. As a result, when a cookie accesses an email, information can be recorded linking the cookie to that email. Since a recipient primarily uses the same agent to access different emails, the cookie belonging to that agent can be associated with one or more emails. The fact that the cookie is associated with these different emails does not mean that all the emails are originally intended for that cookie (or more accurately, the recipient associated with that cookie). For example, the cookie may access an email that is forwarded from that email's original recipient.

An exemplary method of the present invention allows the behavior with respect to each email to be monitored more precisely. More specifically, according to the exemplary method, the first cookie seen in conjunction with an email is marked as a primary cookie for the recipient of that email. In other words, when an email is opened for the first time by a cookie, that cookie is viewed as the cookie primarily used by the recipient of that email to access his/her emails. This is based on the rationale that the intended recipient is almost always the first one to access an email.

Subsequent cookies seen in conjunction with that email are considered to be secondary cookies for that recipient. That is, cookies that access an email that has already been previously accessed or opened are viewed as secondary for the original recipient of that email. As a result, when a cookie accesses a forwarded email, that cookie is considered to be secondary for the original recipient of the forwarded email.

A cookie is considered as primary for only one recipient, while secondary cookies can be shared amongst many recipients. In other words, a cookie cannot be both primary and secondary. Once a cookie is accorded primary status, subsequent secondary events for that cookie including, for example, events related to other recipient's emails, are construed as the recipient associated with that cookie opening an email forwarded from another recipient.

The foregoing describes new cookies that access emails. With cookies that have already been seen (i.e., they are already accorded either a primary or secondary status), FIG. 3 is a table illustrating the state transition of a cookie based on prior cookie state and type of email event that took place according to one exemplary method of the present invention. As shown in FIG. 3, the first column represents the various prior cookie states, the second and third columns respectively represent the two types of email events that can be used to classify the email access by a cookie. The recipient that is originally intended to receive the email is referred to as "Recipient A"; another email recipient is referred to as "Recipient B"; and the cookie accessing the email is referred to as "Cookie C". As will be further described below, when a cookie accesses an email, the current state of the cookie and the type of email event associated with that email access are used to determine the new state of the cookie according to the state transition table shown in FIG. 3. Information relating to the new state of the cookie (i.e., recipient information) can then be reported to the sender of the email.

Referring to FIG. 3, the first row illustrates the situation described above when an email intended for Recipient A is accessed by Cookie C that is new. A new cookie means that this cookie has not been seen or recorded before. There are two possible outcomes depending on how the email access is classified. First, if the email to be accessed has not been previously accessed (i.e., the email is to be accessed for the first time by Cookie C), then Cookie C is accorded a primary status with respect to Recipient A. That is, Cookie C is considered to be an agent used primarily by Recipient A to access his/her emails. This is based on the rationale that the first access to an email to Recipient A is likely to be performed by a cookie that is in fact representative of Recipient A. Alternatively, if the email to be accessed has already been previously accessed, then Cookie C is accorded a secondary status with respect to Recipient A. That is, Cookie C is considered to be an agent that has received the email originally intended for Recipient A, but which may represent either Recipient A or another individual to whom A has forwarded the email. For example, the email that was originally intended for Recipient A has been forwarded by Recipient A to Cookie C. The primary and secondary status can be viewed as two different confidence levels with respect to the association between Recipient A and Cookie C. With the primary status, it can be stated with relatively high confidence that Cookie C is an agent used primarily by Recipient A to access his/her emails; and, conversely, with the secondary status, it can be interpreted that Cookie C is not an agent used primarily by Recipient A to access his/her emails but Cookie C is possibly an agent that has received forwarded emails originally intended for Recipient A.

The second row illustrates the situation where Cookie C accesses an email intended for Recipient A and the current status of Cookie C shows it as being secondary with respect to Recipient A. If the email to be accessed has not been previously accessed (i.e., the email is to be accessed for the first time by Cookie C), then the status of Cookie C is updated to primary with respect to Recipient A. This provides for the situation in which Recipient A uses two agents to access his/her emails. One agent is often used by Recipient A to open emails first and the second agent is used by Recipient A to subsequently access already opened emails. However, occasionally, the second agent is used by Recipient A to open some emails first. The foregoing allows the second agent to be also identified as an agent linked to Recipient A for accessing his/her emails. Alternatively, if the email to be accessed has already been accessed, then the status of Cookie C remains the same, i.e., it stays as secondary with respect to Recipient A. In other words, Cookie C continues to be construed as having received forwarded emails originally intended for Recipient A.

The third row illustrates the situation where Cookie C accesses another email intended for Recipient A and the current status of Cookie C shows it as being primary with respect to Recipient A. In this situation, no action is to be taken with respect to the status of the Cookie C, regardless of the type of email access performed. This is because Cookie C has already been accorded a primary status, therefore, there is no further need to determine the nature of the association between Cookie C and Recipient A.

The fourth row illustrates a situation where the current status of Cookie C shows it as being secondary with respect to Recipient B and Cookie C accesses an email intended for Recipient A. Similarly, as described above, if the email to be accessed has not been previously accessed (i.e., the email is to be accessed for the first time by Cookie C), then the status of Cookie C is updated to primary with respect to Recipient A. Again, this is based on the rationale that if Cookie C represents Recipient A, Cookie C is likely to be first to access an email intended for Recipient A. Cookie C continues to maintain its secondary status with respect to Recipient B. Alternatively, if the email to be accessed has already been accessed, then the status of Cookie C is updated to secondary with respect to Recipient A also. In other words, the situation can be interpreted as Cookie C receiving forwarded emails originally intended for Recipient A. Likewise, Cookie C continues to maintain its secondary status with respect to Recipient B.

The fifth row illustrates a situation where the current status of Cookie C shows it as being primary with respect to Recipient B and Cookie C attempts to access an email intended for Recipient A. With Cookie C showing a primary status with respect to Recipient B, it means that Cookie C has already been determined to be an agent used primarily by Recipient B to access his/her emails. If the email intended for Recipient A and to be accessed by Cookie C has never been previously accessed, then it could possibly mean that Cookie C is an agent used primarily by both Recipients A and B to access their respective emails. To eliminate confusion and resolve this situation, the following tie-breaking rules can be employed to decide between Recipients A and B who should have Cookie C being associated as primary. In the situation where Recipients A and B both have the same number of primary events (i.e., number of times emails being opened for the first time), the following rule can be applied—whoever does not have a cookie with primary status gets to claim Cookie C as its primary cookie. In other words, if Recipient A does not yet have a primary cookie and Recipient B already has one, then Cookie C is updated to primary with respect to Recipient A; otherwise, status of Cookie C remains the same, i.e., Cookie C continues to maintain its primary status with respect to Recipient B. In the situation where Recipients A and B do not have the same number of primary events, a voting structure can be applied—whoever has the higher number of primary events gets Cookie C. This is based on the rationale that if Cookie C is used more often by Recipient A to access first-time emails when compared to Recipient B, then Recipient A should get Cookie C as its primary cookie. Alternatively, if the email to be accessed has already been accessed, then the status of Cookie C is updated to secondary with respect to Recipient A. In other words, the situation can be interpreted as Cookie C accessing a forwarded email originally intended for Recipient A, i.e., the email originally intended for Recipient A has been forwarded to Recipient B and is now being accessed by Recipient B via Cookie C.

Using the logic as described above, the system 10 is able to classify an email open event by a recipient to provide various types of information with respect to the email and the recipient opening the email. Such information includes, for example, confidence levels representing indications as to the estimated relationship between the email and the recipient opening the email, such as, whether the recipient opening the email is an intended recipient of that email or whether the email has been forwarded to the recipient by the intended recipient of that email. Such information can be displayed in different fashions or formats depending on the classification.

Also, such information can also include, for example, confidence levels representing indications as to the estimated relationship between a cookie and a recipient of the email, such as, whether the cookie is associated with the recipient in that the cookie is used primarily by the recipient to access his/her emails. This information can be displayed at a website in the following manner. When a cookie contacts a website that is capable of monitoring the cookie, relevant information relating to that cookie, such as, the cookie-recipient association, can be queried to display that cookie's behavior at that website with respect to the recipient associated with that cookie.

Furthermore, the foregoing logic described in connection with the cookie when an email is accessed can also take into account website behavior incurred as a result of a click-through of a modified hyperlink in an email as described above. For example, a hyperlink having a tracking code is clicked through to the pertinent website. The tracking code can be used to identify a specific email. The click-through is treated as if it was a secondary email open for that email, i.e., the email has been accessed before. The same logic as described above is then invoked to update the information relating to the cookie, such as, the cookie-recipient association.

Based on the disclosure and teachings provided herein, it will be clear to a person of ordinary skill in the art that the information relating to cookies as described above can be used to monitor and determine approximate email behavior as well as the corresponding web behavior of cookies. Applying the foregoing to typical situations, a cookie with primary status with respect to a particular recipient indicates that that cookie is more likely than not used primarily by the particular recipient to access his/her emails, and a cookie with secondary status with respect to one or more recipients indicates that that cookie is more likely than not receiving forwarded emails from the one or more recipients. Such cookie information can be reported to senders of emails for evaluation to determine the effectiveness of their emails.

Referring back to FIG. 1, upon the opening of the email or the commencement of a website session activated from one of the hyperlinks in the email, the logging server 14 collects the relevant information or data and forwards it to the database 18. The database 18, in turn, generates and sends a real-time alert to the sender alerting the sender of pertinent recipient activities. It should be understood that the actions of the database 18 is controlled by control logic.

Figure 2:
FIG. 2 is an exemplary embodiment of an user interface in accordance with the present invention.

Alerts can be provided in a number of different ways. For example, an alert can be delivered via an email to the sender. The email representing the alert may directly include pertinent recipient information; or alternatively, the email may contain hyperlinks to a user interface 30 provided by the system 10. The user interface 30 is managed by the application server 16. Relevant recipient information can be displayed by the user interface 30. FIG. 2 is an exemplary embodiment of the user interface in accordance with the present invention. The user interface 30 provides the user or sender with up-to-the-second information across all recipients of his/her emails. Optionally, the user interface 30 allows the recipient information to be displayed or reported differently. For example, information for one group of recipients can be displayed in one manner, and information for another group of recipients can be displayed in a second manner. Furthermore, the user interface 30 can also allow the user to adjust and customize the reporting patterns of different recipients. For example, a user can decide to receive alerts for selected recipients.

In an exemplary implementation, the system 10 communicates over standard Internet protocols (SMTP & HTTP) and are compliant with well known corporate standards and firewall practices.

The system 10 including its various components as described above represents only one exemplary embodiment of the present invention and is provided for illustrative purposes only. It should be understood that the various functionality of the system 10 as described above can be implemented using a number of different component configurations, in an integrated or non-integrated manner. For example, in an alternative embodiment, the collective functionality of the mail enhancement server 12 and the logging server 14 can be provided by a single server. Furthermore, it should also be understood that the present invention can be realized using control logic implemented in software, hardware or a combination of both, in a modular or integrated manner. Based on the disclosure and teachings provided herein, a person of ordinary skill in the art will know of other ways and/or methods to implement the present invention.

In an exemplary application, the system 10 can be deployed to complement a sales force automation system of a company. As described above, the system 10 can be used to monitor email behavior attributed to emails originated from a single business entity. It should be noted that a single business entity may have one or more related Internet domains. The system 10 enables salespersons to monitor their business contacts and/or customers and improve productivity. For example, as described above, using a tracking code and an image call that specifically identify each email, the email behavior attributed to emails originated from Company X can be monitored. Emails sent by the salespersons of Company X can be monitored to determine the respective responses of the recipients, such as, number and identity of recipients opening and/or forwarding their emails. Furthermore, the system 10 allows website behavior of the recipients to be monitored. For example, an email originated from Company X may contain a hyperlink to Company X's website, or any website associated with Company X. Such hyperlink contains a tracking code that allows Company X's website to identify that email and determine that the recipient reached Company X's website by clicking through on the hyperlink from within that email. Also, an email originated from Company X has an associated cookie that uniquely identifies the recipient of that email. When that cookie visits Company X's website (where it is considered to be a first party cookie), the website behavior of that cookie can be monitored by Company X's website to obtain the approximate website behavior of the recipient. Moreover, the system 10 provides real-time alerts. Salespeople are promptly alerted when emails they have sent are opened and/or forwarded, and when their contacts begin browsing the corporate website. This functionality applies to one-to-one correspondence as well as sales campaigns sent to a large distribution list.

The system 10 also provides automated contact management. The system 10 can update a contact database or a customer relations management system. For example, contact records are created and updated automatically for each contact to whom the salesperson sends an email.

The system 10 further provide behavior reports. Salespeople have access to reports specifying when their contacts open or forward their emails, as well as detailing activities conducted on the corporate website, such as, pages viewed etc. Such reports may also include web behavior analysis allowing salespeople to know exactly what pages of the corporate website each prospect visited and for how long.

In another exemplary application, the system 10 can also be deployed in a cross-promotional or partnering arrangement between two companies, Company X and Company Y. For example, emails originated from Company X may contain corresponding hyperlinks to its own website as well as to Company Y's website. Similarly, the hyperlinks include a tracking code that identifies each email originated from Company X. When the recipient of the email clicks through on the hyperlink associated with Company Y's website, the tracking code can be used to identify that email and determine that the click-through came from an email originated from Company X. Likewise, each email originated from Company X also has an associated cookie that uniquely identifies the recipient of that email. When that cookie visits Company Y's website, that cookie can be identified as being associated with an email originated from Company X and the website behavior of that cookie at Company Y's website can be monitored to obtain the approximate website behavior of the recipient. The website behavior at Company Y's website resulting from the email originated from Company X can be reported to both Company X and Company Y. As a result, Company Y is not only able to obtain information relating to the website behavior of certain individuals but is also able to determine Company X's contribution in directing traffic to Company Y's website.

Based on the disclosure and teachings provided herein, a person of ordinary skill in the art will know of other ways and/or methods to deploy the present invention in other applications and contexts.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for monitoring email behavior of an email recipient, the email recipient being associated with a first email domain, comprising:
   control logic configured to modify an outgoing email addressed to the email recipient and sent using an email client configured to allow a sender to send the outgoing email and access one or more personal or corporate emails belonging to the sender, wherein the control logic configured to modify the outgoing email is further configured to edit the outgoing email to include a tracking code, wherein the tracking code is uniquely associated with the outgoing email, the email recipient, the sender or the business entity associated with the sender or a combination thereof; and
   control logic configured to monitor the email behavior of the email recipient with respect to the modified outgoing email;
   wherein the monitoring of the email behavior is performed within an Internet domain related to the sender or a business entity associated with the sender;
   wherein the first email domain and the Internet domain related to the sender or the business entity associated with the sender are different;
   wherein upon the email recipient opening the modified outgoing email, a connection to a remote server is made in which the tracking code is transmitted to the remote server;
   wherein the connection to the remote server is an image call inserted into the modified outgoing email;
   wherein the tracking code is embedded within the image call; and
   wherein upon receipt of the tracking code by the remote server, the remote server is able to determine whether the modified outgoing email has been opened by the email recipient.

2. The system of claim 1 wherein the control logic configured to modify the outgoing email is embedded within a mail server, a mail relay server or a mail enhancement server.

3. The system of claim 1 wherein the control logic configured to modify the outgoing email is embedded within the email client, a plug-in to the email client or an email client utility.

4. The system of claim 1 further comprising:
   control logic configured to examine the outgoing email to determine if there is a plurality of recipients; and
   control logic configured to generate a copy of the outgoing email for each recipient if it is determined that there is a plurality of recipients; and
   wherein if one or more copies of the outgoing email are generated for the plurality of recipients, each copy of the outgoing email is modified to allow email behavior of the corresponding recipient to be monitored.

5. The system of claim 1 further comprising:
   control logic configured to determine whether the outgoing email is to be processed before making any modifications.

6. The system of claim 1 further comprising:
   control logic configured to evaluate the outgoing email in accordance with an opt-out policy to determine whether or not if any modification is to be made to the outgoing email.

7. The system of claim 1 further comprising:
   a user interface configured to allow the sender to review monitored email behavior of the email recipient.

8. The system of claim 1 further comprising:
   control logic configured to update a contact database with information relating to the email recipient.

9. A system for monitoring email behavior of an email recipient, the email recipient being associated with a first email domain, comprising:
   control logic configured to modify an outgoing email addressed to the email recipient and sent using an email client configured to allow a sender to send the outgoing email and access one or more personal or corporate emails belonging to the sender, wherein the control logic configured to modify the outgoing email is further configured to edit the outgoing email to include a tracking code, wherein the tracking code is uniquely associated with the outgoing email, the email recipient, the sender or the business entity associated with the sender or a combination thereof; and control logic configured to monitor the email behavior of the email recipient with respect to the modified outgoing email;

wherein the monitoring of the email behavior is performed within an Internet domain related to the sender or a business entity associated with the sender;

wherein the first email domain and the Internet domain related to the sender or the business entity associated with the sender are different;

wherein upon the email recipient opening the modified outgoing email, a connection to a remote server is made in which the tracking code is transmitted to the remote server;

wherein the connection to the remote server is established via a hyperlink in the modified outgoing email;

wherein the tracking code is embedded within the hyperlink; and wherein upon receipt of the tracking code by the remote server, the remote server is able to determine whether the modified outgoing email has been opened by the email recipient.

10. A system for monitoring email behavior of an email recipient, the email recipient being associated with a first email domain, comprising:

control logic configured to modify an outgoing email addressed to the email recipient and sent using an email client configured to allow a sender to send the outgoing email and access one or more personal or corporate emails belonging to the sender, wherein the control logic configured to modify the outgoing email is further configured to post the modified outgoing email to a remote location and inform the email recipient to access the modified outgoing email at the remote location; and control logic configured to monitor the email behavior of the email recipient with respect to the modified outgoing email;

wherein the monitoring of the email behavior is performed within an Internet domain related to the sender or a business entity associated with the sender; and wherein the first email domain and the Internet domain related to the sender or the business entity associated with the sender are different;

wherein upon the email recipient contacting the remote location to access the modified outgoing email, an identifier is associated with the email recipient or an agent of the email recipient; and wherein the identifier is uniquely associated with the email recipient or its agent and is used in connection with monitoring the email behavior of the email recipient.

11. The system of claim 10 wherein the association between the identifier and the email recipient or its agent is established by the remote location transmitting the identifier to the agent being used by the email recipient to establish contact with the remote location.

12. A system for monitoring email behavior of email recipients, each email recipient being associated with an email domain, comprising:

a plurality of email clients configured for use by a plurality of corresponding senders to send a plurality of outgoing emails and access a plurality of incoming personal or corporate emails, the plurality of senders respectively having a plurality of email accounts for sending the plurality of outgoing emails and accessing the plurality of incoming personal or corporate emails, the plurality of email accounts being associated with an Internet domain or a business entity associated with the plurality of senders;

control logic configured to modify the plurality of outgoing emails, wherein the control logic configured to modify the plurality of outgoing emails is further configured to edit one or more of the plurality of outgoing emails to each include a tracking code, wherein each tracking code is uniquely associated with its corresponding modified outgoing email, recipient, sender or a business entity associated with the sender or a combination thereof; and control logic configured to monitor email behavior of corresponding recipients with respect to the plurality of modified outgoing emails;

wherein the monitoring of the email behavior is performed within the Internet domain, and wherein the Internet domain is related to the plurality of senders or the business entity associated with the plurality of senders;

wherein the corresponding email domains of the email recipients are different from the Internet domain that is related to the plurality of senders or the business entity associated with the plurality of senders;

wherein upon a recipient opening a corresponding modified outgoing email, a connection to a remote server is made in which the associated tracking code is transmitted to the remote server;

wherein the connection to the remote sever is an image call inserted into the corresponding modified outgoing email;

wherein the associated tracking code is embedded within the image call; and wherein upon receipt of the associated tracking code by the remote server, the remote server is able to determine whether the corresponding modified outgoing email has been opened by the recipient.

13. The system of claim 12 wherein the control configured to modify the plurality of outgoing emails is embedded within a mail server, a mail relay server or a mail enhancement server.

14. The system of claim 12 wherein the control logic configured to modify the plurality of outgoing emails is embedded within an email client, a plug-in to the email client or an email client utility.

15. The system of claim 12 further comprising:

control logic configured to examine one or more of the plurality of outgoing emails to determine if each examined outgoing email has a plurality of recipients; and control logic configured to, for each examined outgoing email that is determined to have a plurality of recipients, generate a copy of the examined outgoing email for each recipient; and wherein for each examined outgoing email, if one or more copies of the examined outgoing email are generated for the plurality of recipients, each copy of the examined outgoing email is modified to allow email behavior of the corresponding recipient to be monitored.

16. The system of claim 12 further comprising:

control logic to determine whether one or more of the plurality of outgoing emails are to be processed before making any modifications.

17. The system of claim 12 further comprising:

control logic configured to evaluate one or more of the plurality of outgoing emails in accordance with an opt-out policy to determine whether or not if any modification is to be made.

18. The system of claim 12 further comprising:
a user interface configured to allow the plurality of senders to review monitored email behavior of the corresponding recipients.

19. The system of claim 12 further comprising:
control logic configured to update a contact database with information relating to one or more of the corresponding recipients of the plurality of modified outgoing emails.

20. A system for monitoring email behavior of email recipients, each email recipient being associated with an email domain, comprising:
a plurality of email clients configured for use by a plurality of corresponding senders to send a plurality of outgoing emails and access a plurality of incoming personal or corporate emails, the plurality of senders respectively having a plurality of email accounts for sending the plurality of outgoing emails and accessing the plurality of incoming personal or corporate emails, the plurality of email accounts being associated with an Internet domain or a business entity associated with the plurality of senders;
control logic configured to modify the plurality of outgoing emails, wherein the control logic configured to modify the plurality of outgoing emails is further configured to edit one or more of the plurality of outgoing emails to each include a tracking code, wherein each tracking code is uniquely associated with its corresponding modified outgoing email, recipient, sender or a business entity associated with the sender or a combination thereof; and
control logic configured to monitor email behavior of corresponding recipients with respect to the plurality of modified outgoing emails;
wherein the monitoring of the email behavior is performed within the Internet domain, and wherein the Internet domain is related to the plurality of senders or the business entity associated with the plurality of senders;
wherein the corresponding email domains of the email recipients are different from the Internet domain that is related to the plurality of senders or the business entity associated with the plurality of senders;
wherein upon a recipient opening a corresponding modified outgoing email, a connection to a remote server is made in which the associated tracking code is transmitted to the remote server;
wherein the connection to the remote server is established via a hyperlink in the corresponding modified outgoing email;
wherein the associated tracking code is embedded within the hyperlink; and
wherein upon receipt of the associated tracking code by the remote server, the remote server is able to determine whether the corresponding modified outgoing email has been opened by the recipient.

21. A system for monitoring email behavior of email recipients, each email recipient being associated with an email domain, comprising:
a plurality of email clients configured for use by a plurality of corresponding senders to send a plurality of outgoing emails and access a plurality of incoming personal or corporate emails, the plurality of senders respectively having a plurality of email accounts for sending the plurality of outgoing emails and accessing the plurality of incoming personal or corporate emails, the plurality of email accounts being associated with an Internet domain or a business entity associated with the plurality of senders;
control logic configured to modify the plurality of outgoing emails, wherein the control logic configured to modify the outgoing emails is further configured to post the modified outgoing emails to a remote location and inform the corresponding recipients to access their respective modified outgoing emails at the remote location; and
control logic configured to monitor email behavior of corresponding recipients with respect to the plurality of modified outgoing emails;
wherein the monitoring of the email behavior is performed within the Internet domain, and wherein the Internet domain is related to the plurality of senders or the business entity associated with the plurality of senders;
wherein the corresponding email domains of the email recipients are different from the Internet domain that is related to the plurality of senders or the business entity associated with the plurality of senders;
wherein upon a recipient contacting the remote location to access the corresponding modified outgoing email, an identifier is associated with the recipient or an agent of the recipient; and
wherein the identifier is uniquely associated with the recipient or its agent and is used in connection with monitoring the email behavior of the recipient.

22. The system of claim 21 wherein the association between the identifier and the email recipient or its agent is established by the remote location transmitting the identifier to the agent being used by the email recipient to establish contact with the remote location.

23. A method for monitoring email behavior of an email recipient, the email recipient being associated with a first email domain, comprising:
modifying an outgoing email addressed to the email recipient and sent using an email client configured to allow a sender to send the outgoing email and access one or more personal or corporate emails belonging to the sender, wherein modifying includes editing the outgoing email to include a tracking code, wherein the tracking code is uniquely associated with the outgoing email, the email recipient, the sender or the business entity associated with the sender or a combination thereof;
monitoring the email behavior of the email recipient with respect to the modified outgoing email;
wherein the monitoring of the email behavior is performed within an Internet domain related to the sender or a business entity associated with the sender; and
wherein the first email domain and the Internet domain related to the sender or the business entity associated with the sender are different; and
upon the email recipient opening the modified outgoing email, establishing a connection to a remote server in which the tracking code is transmitted to the remote server, wherein the connection to the remote server is an image call inserted into the modified outgoing email, and wherein the tracking code is embedded within the image call and
upon receipt of the tracking code by the remote server, determining whether the modified outgoing email has been opened by the email recipient.

24. A mail server, a mail relay server or a mail enhancement server utilizing the method of claim 23.

25. An email client, a plug-in to the email client or an email client utility utilizing the method of claim 23.

26. The method of claim 23 further comprising:
examining the outgoing email to determine if there is a plurality of recipients; and
generating a copy of the outgoing email for each recipient if it is determined that there is a plurality of recipients; and
if one or more copies of the outgoing email are generated for the plurality of recipients, modifying each copy of the outgoing email to allow email behavior of the corresponding recipient to be monitored.

27. The method of claim 23 further comprising:
determining whether the outgoing email is to be processed before making any modifications.

28. The method of claim 23 further comprising:
evaluating the outgoing email in accordance with an opt-out policy to determine whether or not if any modification is to be made to the outgoing email.

29. The method of claim 23 further comprising:
providing a user interface configured to allow the sender to review monitored email behavior of the email recipient.

30. The method of claim 23 further comprising:
updating a contact database with information relating to the email recipient.

31. A method for monitoring email behavior of an email recipient, the email recipient being associated with a first email domain, comprising:
modifying an outgoing email addressed to the email recipient and sent using an email client configured to allow a sender to send the outgoing email and access one or more personal or corporate emails belonging to the sender, wherein modifying includes editing the outgoing email to include a tracking code, wherein the tracking code is uniquely associated with the outgoing email, the email recipient, the sender or the business entity associated with the sender or a combination thereof;
monitoring the email behavior of the email recipient with respect to the modified outgoing email;
wherein the monitoring of the email behavior is performed within an Internet domain related to the sender or a business entity associated with the sender; and
wherein the first email domain and the Internet domain related to the sender or the business entity associated with the sender are different; and
upon the email recipient opening the modified outgoing email, establishing a connection to a remote server in which the tracking code is transmitted to the remote server;
wherein the connection to the remote server is established via a hyperlink in the modified outgoing email; and
wherein the tracking code is embedded within the hyperlink; and
upon receipt of the tracking code by the remote server, determining whether the modified outgoing email has been opened by the email recipient.

32. A method for monitoring email behavior of an email recipient, the email recipient being associated with a first email domain, comprising:
modifying an outgoing email addressed to the email recipient and sent using an email client configured to allow a sender to send the outgoing email and access one or more personal or corporate emails belonging to the sender; and
monitoring the email behavior of the email recipient with respect to the modified outgoing email, wherein the monitoring of the email behavior is performed within an Internet domain related to the sender or a business entity associated with the sender, and wherein the first email domain and the Internet domain related to the sender or the business entity associated with the sender are different; and
posting the modified outgoing email to a remote location and informing the email recipient to access the modified outgoing email at the remote location; and
upon the email recipient contacting the remote location to access the modified outgoing email, associating an identifier with the email recipient or an agent of the email recipient;
wherein the identifier is uniquely associated with the email recipient or its agent and is used in connection with monitoring the website behavior of the email recipient.

33. The method of claim 32 wherein the association between the identifier and the email recipient or its agent is established by the remote location transmitting the identifier to the agent being used by the email recipient to establish contact with the remote location.

34. A method for monitoring email behavior of email recipients, each email recipient being associated with an email domain, comprising:
modifying a plurality of outgoing emails respectively sent by a plurality of email clients, the plurality of email clients configured for use by a plurality of corresponding senders to send the plurality of outgoing emails and access a plurality of incoming personal or corporate emails, the plurality of senders respectively having a plurality of email accounts for sending the plurality of outgoing emails and accessing the plurality of incoming personal or corporate emails, the plurality of email accounts being associated with an Internet domain or a business entity associated with the plurality of senders;
wherein modifying the plurality of outgoing emails further includes editing one or more of the plurality of outgoing emails to each include a tracking code, wherein each tracking code is uniquely associated with its corresponding modified outgoing email, recipient, sender or a business entity associated with the sender or a combination thereof;
monitoring email behavior of corresponding recipients with respect to the plurality of modified outgoing emails;
wherein the monitoring of the email behavior is performed within the Internet domain, and wherein the Internet domain is related to the plurality of senders or the business entity associated with the plurality of senders; and
wherein the corresponding email domains of the email recipients are different from the Internet domain that is related to the plurality of senders or the business entity associated with the plurality of senders;
upon a recipient opening a corresponding modified outgoing email, establishing a connection to a remote server in which the associated tracking code is transmitted to the remote server, wherein the connection to the remote server is an image call inserted into the corresponding modified outgoing email, wherein the associated tracking code is embedded within the image call; and upon receipt of the associated tracking code by the remote server, determining whether the corresponding modified outgoing email has been opened by the recipient.

35. A mail server, a mail relay server or a mail enhancement server utilizing the method of claim 34.

36. An email client, a plug-in to the email client or an email client utility utilizing the method of claim 34.

37. The method of claim 34 further comprising:
examining one or more of the plurality of outgoing emails to determine if each examined outgoing email has a plurality of recipients;

for each examined outgoing email that is determined to have a plurality of recipients, generating a copy of the examined outgoing email for each recipient; and for each examined outgoing email, if one or more copies of the examined outgoing email are generated for the plurality of recipients, modifying each copy of the examined outgoing email to allow email behavior of the corresponding recipient to be monitored.

38. The method of claim 34 further comprising:
determining whether one or more of the plurality of outgoing emails are to be processed before making any modifications.

39. The method of claim 34 further comprising:
evaluating one or more of the plurality of outgoing emails in accordance with an opt-out policy to determine whether or not if any modification is to be made.

40. The method of claim 34 further comprising:
providing a user interface configured to allow the plurality of senders to review monitored email behavior of the corresponding recipients.

41. The method of claim 34 further comprising:
updating a contact database with information relating to one or more of the corresponding recipients of the plurality of modified outgoing emails.

42. A method for monitoring email behavior of email recipients, each email recipient being associated with an email domain, comprising:
modifying a plurality of outgoing emails respectively sent by a plurality of email clients, the plurality of email clients configured for use by a plurality of corresponding senders to send the plurality of outgoing emails and access a plurality of incoming personal or corporate emails, the plurality of senders respectively having a plurality of email accounts for sending the plurality of outgoing emails and accessing the plurality of incoming personal or corporate emails, the plurality of email accounts being associated with an Internet domain or a business entity associated with the plurality of senders;

wherein modifying the plurality of outgoing emails further includes editing one or more of the plurality of outgoing emails to each include a tracking code, wherein each tracking code is uniquely associated with its corresponding modified outgoing email, recipient, sender or a business entity associated with the sender or a combination thereof;

monitoring email behavior of corresponding recipients with respect to the plurality of modified outgoing emails;

wherein the monitoring of the email behavior is performed within the Internet domain, and wherein the Internet domain is related to the plurality of senders or the business entity associated with the plurality of senders; and wherein the corresponding email domains of the email recipients are different from the Internet domain that is related to the plurality of senders or the business entity associated with the plurality of senders;

upon a recipient opening a corresponding modified outgoing email, establishing a connection to a remote server in which the associated tracking code is transmitted to the remote server, wherein the connection to the remote server is established via a hyperlink in the corresponding modified outgoing email; and wherein the associated tracking code is embedded within the hyperlink; and upon receipt of the associated tracking code by the remote server, determining whether the corresponding modified outgoing email has been opened by the recipient.

43. A method for monitoring email behavior of email recipients, each email recipient being associated with an email domain, comprising:
modifying a plurality of outgoing emails respectively sent by a plurality of email clients, the plurality of email clients configured for use by a plurality of corresponding senders to send the plurality of outgoing emails and access a plurality of incoming personal or corporate emails, the plurality of senders respectively having a plurality of email accounts for sending the plurality of outgoing emails and accessing the plurality of incoming personal or corporate emails, the plurality of email accounts being associated with an Internet domain or a business entity associated with the plurality of senders;

monitoring email behavior of corresponding recipients with respect to the plurality of modified outgoing emails, wherein the monitoring of the email behavior is performed within the Internet domain, and wherein the Internet domain is related to the plurality of senders or the business entity associated with the plurality of senders, and wherein the corresponding email domains of the email recipients are different from the Internet domain that is related to the plurality of senders or the business entity associated with the plurality of senders;

posting the modified outgoing emails to a remote location and informing the corresponding recipients to access their respective modified outgoing emails at the remote location; and upon a recipient contacting the remote location to access the corresponding modified outgoing email, associating an identifier with the recipient or an agent of the recipient;

wherein the identifier is uniquely associated with the recipient or its agent and is used in connection with monitoring the email behavior of the recipient.

44. The method of claim 43 wherein the association between the identifier and the recipient or its agent is established by the remote location transmitting the identifier to the agent being used by the recipient to establish contact with the remote location.

* * * * *

(12) EX PARTE REEXAMINATION CERTIFICATE (7066th)
United States Patent
Knox et al.

(10) Number: US 7,072,947 C1
(45) Certificate Issued: Sep. 15, 2009

(54) METHOD AND SYSTEM FOR MONITORING E-MAIL AND WEBSITE BEHAVIOR OF AN E-MAIL RECIPIENT

(75) Inventors: Andrew Knox, San Francisco, CA (US); Lars Knox, San Francisco, CA (US); John Hart, Washington, DC (US)

(73) Assignee: Fionix Inc., Daejeon (KR)

Reexamination Request:
No. 90/008,953, Dec. 5, 2007

Reexamination Certificate for:
Patent No.: 7,072,947
Issued: Jul. 4, 2006
Appl. No.: 10/289,690
Filed: Nov. 6, 2002

Related U.S. Application Data
(60) Provisional application No. 60/333,287, filed on Nov. 6, 2001.

(51) Int. Cl.
*G06F 13/00* (2006.01)

(52) U.S. Cl. .................................. 709/217; 709/224
(58) Field of Classification Search .................. None
See application file for complete search history.

(56) References Cited

FOREIGN PATENT DOCUMENTS

| EP | 0 869 652 A2 | 10/1958 |
|---|---|---|
| WO | WO 00/64118 A2 | 12/2000 |
| WO | WO 01/15196 A1 | 3/2001 |

OTHER PUBLICATIONS

Richard M. Smith, The Web Bug FAQ, Nov. 11, 1999, ver. 1.0, pp. 1-4.

*Primary Examiner*—James Menefee

(57) ABSTRACT

A system for monitoring email and website behavior of an email recipient is provided. According to one exemplary embodiment, the system includes a mail enhancement server and a logging server. The mail enhancement server is configured to intercept all outgoing emails from a mail server. The mail enhancement server then modifies each outgoing email to include a tracking code. The tracking code is embedded in an image call which in turn is also inserted into the outgoing email. If the outgoing email contains hyperlinks, each hyperlink is also modified to include the tracking code. The tracking code is uniquely associated with the outgoing email. The image call (and the tracking code) is used to detect when the recipient of the outgoing email has opened that email. The tracking code, when embedded in a hyperlink, is also used to monitor whether the recipient has opened the email and/or clicked through on one or more of the hyperlinks in the email. The logging server associates a cookie with the recipient of the outgoing email. When the logging server received an image call, the corresponding image and the cookie are concurrently delivered to the recipient. The cookie is used to monitor the behavior of the recipient at a website, regardless of how the recipient arrives at that website, be it through a click-through from the email or otherwise. The logging server is configured to capture and store relevant information relating to the outgoing email thereby allowing the sender of the outgoing email and the recipient to be linked and the behavior of the recipient to be monitored via the tracking code, the image call and the cookie.

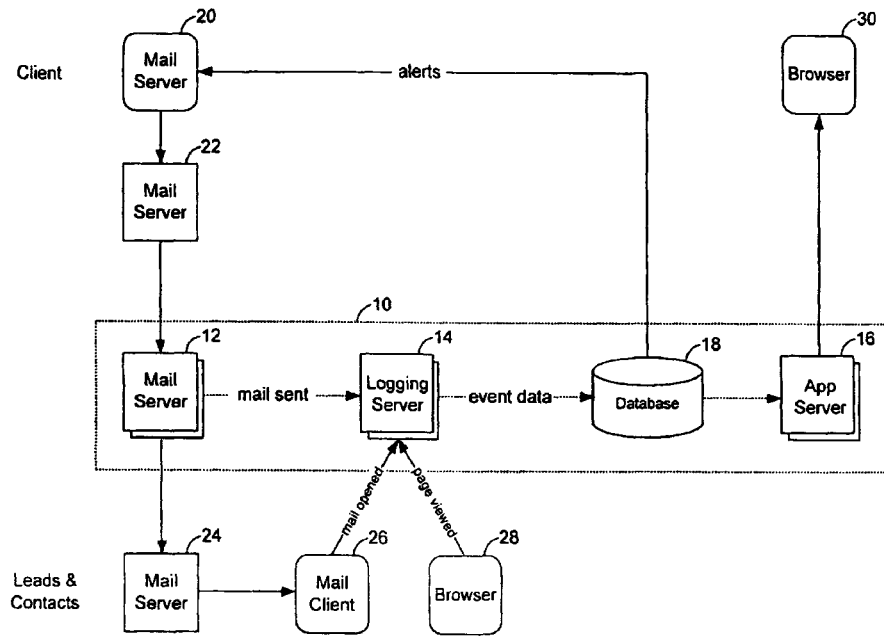

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–44 is confirmed.

* * * * *